(12) United States Patent
Iyasu et al.

(10) Patent No.: US 10,050,513 B2
(45) Date of Patent: Aug. 14, 2018

(54) CONTROL APPARATUS CAPABLE OF APPROPRIATELY SUPPRESSING A SURGE VOLTAGE

(71) Applicant: DENSO CORPORATION, Kariya, Aichi-pref. (JP)

(72) Inventors: Seiji Iyasu, Nishio (JP); Yuji Hayashi, Nishio (JP); Kimikazu Nakamura, Kariya (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/816,498

(22) Filed: Nov. 17, 2017

(65) Prior Publication Data

US 2018/0138802 A1 May 17, 2018

(30) Foreign Application Priority Data

Nov. 17, 2016 (JP) ................................ 2016-224454

(51) Int. Cl.
| | |
|---|---|
| *H02M 3/335* | (2006.01) |
| *H02H 7/125* | (2006.01) |
| *H02H 7/122* | (2006.01) |
| *H02M 1/088* | (2006.01) |
| *H02M 1/00* | (2006.01) |

(52) U.S. Cl.
CPC ....... *H02M 1/088* (2013.01); *H02M 3/33592* (2013.01); *H02M 2001/0009* (2013.01)

(58) Field of Classification Search
CPC ......... H02M 3/33546; H02M 3/33569; H02M 3/33576; H02M 3/33584; H02M 3/33592

USPC .. 363/17, 21.02, 21.03, 21.05, 21.06, 21.09, 363/53, 56.03, 78, 79
See application file for complete search history.

(56) References Cited

U.S. PATENT DOCUMENTS

| | | | |
|---|---|---|---|
| 2005/0047175 A1* | 3/2005 | Kawasaki | ......... H02M 3/33569 363/16 |
| 2008/0101097 A1* | 5/2008 | Kawasaki | ............. H01F 27/255 363/20 |
| 2015/0023062 A1* | 1/2015 | Hyugaji | ............ H02M 3/33592 363/16 |

FOREIGN PATENT DOCUMENTS

JP       2015-077046 A       4/2015

\* cited by examiner

*Primary Examiner* — Gary Nash
(74) *Attorney, Agent, or Firm* — Oliff PLC

(57) ABSTRACT

A control apparatus is provided which controls a power converter including a first circuit including first-side switching elements, and a second circuit including second-side switching elements and a choke coil. The control apparatus includes a current obtainment unit which obtains a value of current flowing through the choke coil, and a control unit which, when power is supplied from the second circuit to the first circuit, keeps a first-side switching element ON during a predetermined time period, before turning off at least one second-side switching element in an on state, the first-side switching element generating a reverse current in the second-side switching element to be turned off. The control unit performs control of keeping the first-side switching element ON during the predetermined time period and control of turning off the second-side switching element, on condition that the obtained value of the current is more than a predetermined command value.

9 Claims, 11 Drawing Sheets

CONTROL APPARATUS CAPABLE OF APPROPRIATELY SUPPRESSING A SURGE VOLTAGE

CROSS-REFERENCE TO RELATED APPLICATION

This application is based on and claims the benefit of priority from earlier Japanese Patent Application No. 2016-224454 filed Nov. 17, 2016, the description of which is incorporated herein by reference.

BACKGROUND

Technical Field

The present invention relates to a control apparatus which controls a power converter.

Related Art

Conventionally, in a power converter having a first circuit including a plurality of first-side switching elements, and a second circuit that is connected to the first circuit via a transformer and includes a plurality of second-side switching elements and a choke coil, control is performed so that power is supplied from the second circuit to the first circuit.

Examples of a control apparatus that performs this control include the control apparatus disclosed in JP 2015-077046 A. In the control apparatus disclosed in JP 2015-077046 A, in order to suppress a surge voltage that occurs when the second-side switching element is turned off, a first-side switching element that generates a reverse current at a second-side switching element to be turned off is controlled to be kept in an on state during a predetermined time period before the second-side switching element is turned off.

In the control apparatus disclosed in JP 2015-077046 A, there is a case in which a load connected to a first circuit varies and a current value in a second circuit decreases. In this case, when the first-side switching element is turned on, the current value in the second circuit excessively decreases and a reverse current flows, and turning off the second-side switching element will cause a surge voltage.

SUMMARY

An embodiment provides a control apparatus capable of appropriately suppressing a surge voltage.

As an aspect of the embodiment, a control apparatus is provided which controls a power converter including a first circuit including a plurality of first-side switching elements, and a second circuit that is connected to the first circuit via a transformer and includes a plurality of second-side switching elements and a choke coil. The control apparatus includes: a current obtainment unit which obtains, as an instantaneous value, a value of current flowing through the choke coil; and a control unit which, when electrical power is supplied from the second circuit to the first circuit, keeps a first-side switching element in an on state during a predetermined time period, before turning off at least one second-side switching element among the plurality of second-side switching elements that are in an on state, the first-side switching element being included in the plurality of first-side switching elements and generating a reverse current in the at least one second-side switching element to be turned off. The control unit performs control of keeping the first-side switching element in an on state during the predetermined time period and control of turning off the at least one second-side switching element, on condition that the value of the current obtained by the current obtainment unit is more than a predetermined command value.

DETAILED DESCRIPTION OF THE PREFERRED EMBODIMENTS

Figure 1:
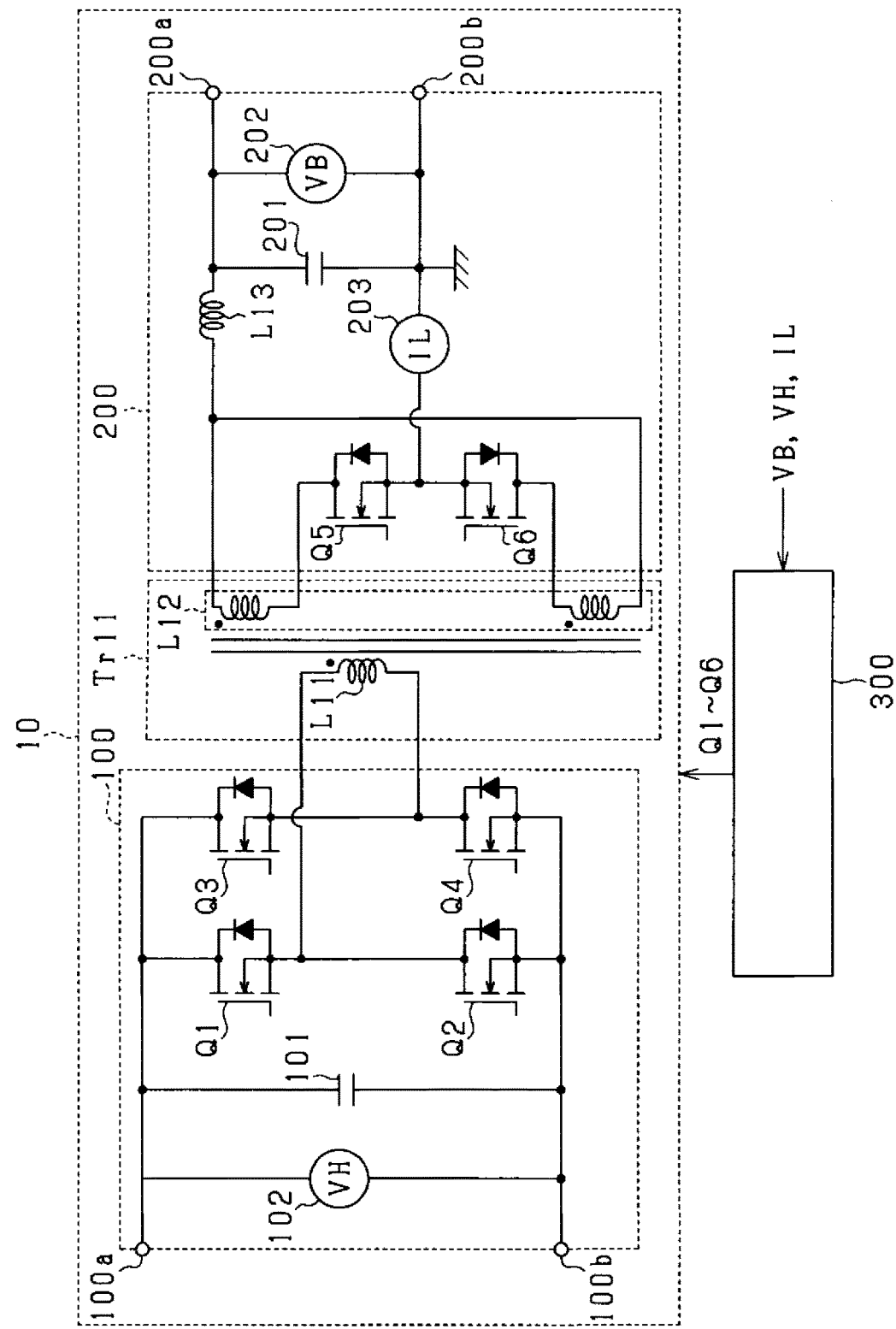
FIG. 1 is a circuit diagram of a power converter.

Embodiments will be described below with reference to the drawings. Note that the same or equivalent parts throughout the following embodiments share the same reference signs in the drawings, and the same description applies to the parts denoted by the same reference signs.

First Embodiment

FIG. 1 is a circuit diagram of a power converter 10 according to the present embodiment. The power converter 10 includes a first circuit 100 and a second circuit 200 electrically connected via a transformer Tr11, and a control unit (control apparatus) 300 that controls the first circuit 100 and the second circuit 200.

The transformer Tr11 includes a first coil L11 and a second coil L12 magnetically coupled with each other, and the second coil L12 has a center tap. The number of turns of the first coil L11 is N/2 times the number of turns of the second coil L12. Specifically, the number of turns of the first coil L11 is N times the number of turns from one of the ends of the second coil L12 up to the center tap.

The first circuit 100 connected to the first coil L11 includes first to fourth switching elements Q1 to Q4. In the present embodiment, N-type metal-oxide-semiconductor field-effect transistors (MOSFETs) are used as the first to fourth switching elements Q1 to Q4. One of the ends of the first coil L11 is connected to the source of the first switching element Q1 and the drain of the second switching element Q2. The other of the ends of the first coil L11 is connected to the source of the third switching element Q3 and the drain of the fourth switching element Q4. The drain of the first switching element Q1 and the drain of the third switching element Q3 are connected to a positive electrode side terminal 100a, and the source of the second switching element Q2 and the source of the fourth switching element Q4 are connected to a negative electrode side terminal 100b. A capacitor 101 is connected in parallel with the positive electrode side terminal 100a and the negative electrode side terminal 100b. A secondary battery such as a lithium ion battery is, for example, connected to the positive electrode side terminal 100a and the negative electrode side terminal 100b. Note that the first to fourth switching elements Q1 to Q4 may be referred to as first-side switching elements.

The second circuit 200 connected to the second coil L12 includes a fifth switching element Q5, a sixth switching element Q6, and a choke coil L13. In the present embodiment, N-type MOSFETs are used as the fifth and sixth switching elements Q5 and Q6. Opposite ends of the second coil L12 are connected to the drain of the fifth switching element Q5 and the drain of the sixth switching element Q6, respectively. Meanwhile, the source of the fifth switching element Q5 and the source of the sixth switching element Q6 are connected to each other. The center tap of the second coil L12 is connected to a positive electrode side terminal 200a via the choke coil L13, and the connection point between the fifth switching element Q5 and the sixth switching element Q6 is connected to a negative electrode side terminal 200b. A capacitor 201 is connected in parallel with these positive electrode side terminal 200a and negative electrode side terminal 200b. A secondary battery such as a lead-acid battery is, for example, connected to the positive electrode side terminal 200a and the negative electrode side terminal 200b. Note that the fifth and sixth switching elements Q5 and Q6 may be referred to as second-side switching elements.

The transformer Tr11 which connects the first circuit 100 and the second circuit 200 configured as described above will be described in detail. When voltage is applied to the first coil L11 of the transformer Tr in the direction from the first switching element Q1 to the fourth switching element Q4, voltage is applied to the fifth switching element Q5 in the direction from the negative electrode side terminal 200b to the positive electrode side terminal 200a, and voltage is applied to the sixth switching element Q6 in the direction from the positive electrode side terminal 200a to the negative electrode side terminal 200b, on the side of the second coil L12. When voltage is applied to the first coil L11 in the direction from the third switching element Q3 to the second switching element Q2, voltage is applied to the fifth switching element Q5 in the direction from the positive electrode side terminal 200a to the negative electrode side terminal 200b, and voltage is applied to the sixth switching element Q6 in the direction from the negative electrode side terminal 200b to the positive electrode side terminal 200a, on the side of the second coil L12.

The power converter 10 includes a first voltage detection unit 102 which detects a first voltage VH that is a voltage between the positive electrode side terminal 100a and the negative electrode side terminal 100b of the first circuit 100, a second voltage detection unit 202 which detects a second voltage VB that is a voltage between the positive electrode side terminal 200a and the negative electrode side terminal 200b of the second circuit 200, and a current detection unit 203 which detects a current value IL that is a current flowing through the second circuit 200. The detected first voltage VH, second voltage VB, and current value IL are input to the control unit 300.

The control performed by the control unit 300 will be described with reference to FIGS. 2 and 3. In both the first control illustrated in FIG. 2 and the second control illustrated in FIG. 3, control is performed to alternately repeat a time period during which the fifth switching element Q5 and the sixth switching element Q6 are both kept in an on state and a time period during which one of the fifth switching element Q5 and the sixth switching element Q6 is kept in an on state. More specifically, each of the fifth switching element Q5 and the sixth switching element Q6 is controlled to be turned on at the start of a single control period Ts, and kept in the on state for a period longer than half the control period, which is shifted by half thereof.

Figure 4:
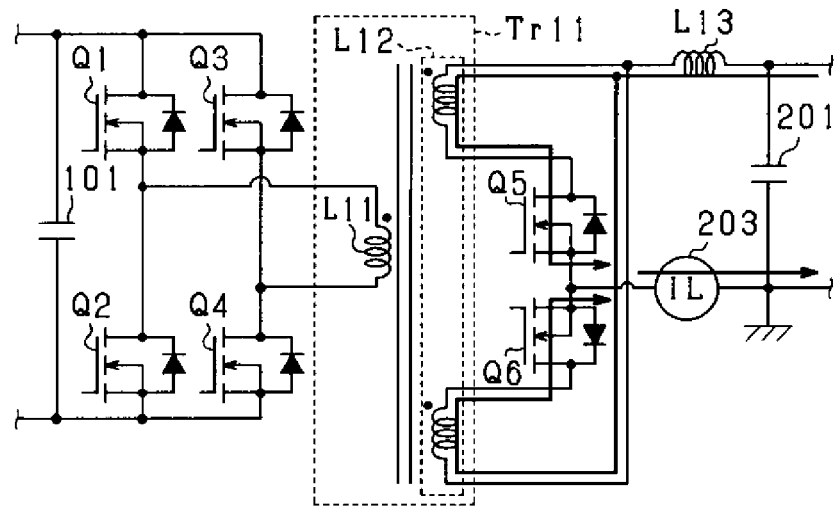
FIG. 4 shows an electrical pathway when fifth and sixth switching elements are in on states.

In the case in which this control is performed, in the time period during which the fifth switching element Q5 and the sixth switching element Q6 are both kept in an on state, as indicated by the electrical pathway in FIG. 4, magnetic flux generated from the second coil L12 in the transformer Tr11 is balanced, and no electrical power is supplied from the second coil L12 to the first coil L11. Thus, the current value IL increases. In the time period during which one of the fifth switching element Q5 and the sixth switching element Q6 is kept in an off state, electrical power is supplied from the second coil L12 to the first coil L11 of the transformer Tr11, and the current value IL decreases. The electrical power is supplied from the second circuit 200 to the first circuit 100 in this time period.

Figure 2:
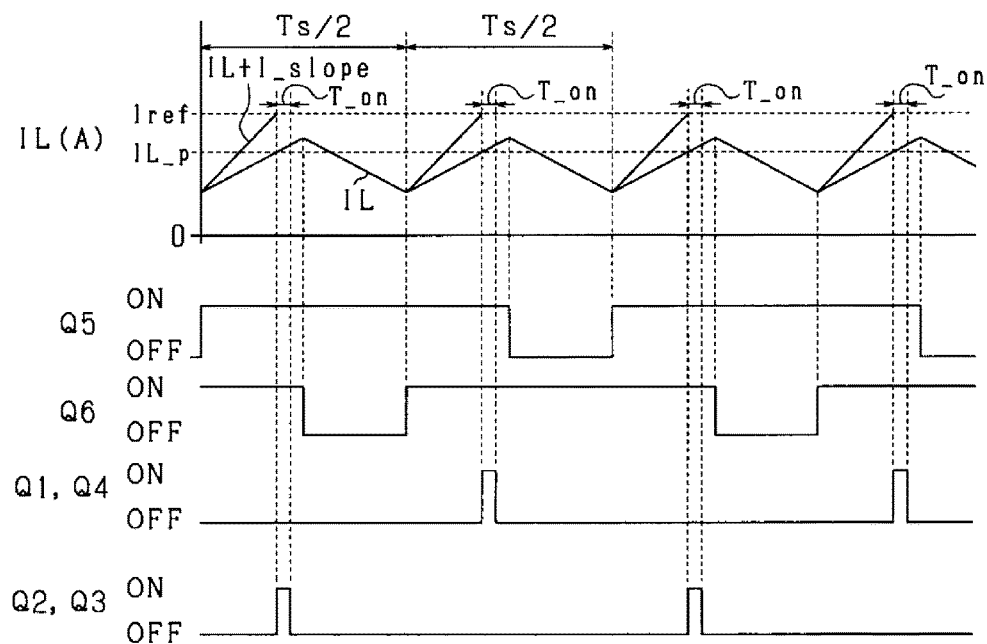
FIG. 2 is a time chart of a first control.

For such control, in the first control illustrated in FIG. 2, before one of the fifth switching element Q5 and the sixth switching element Q6 is turned off, the first to fourth switching elements Q1 to Q4 are controlled in order to reduce the current that flows through the switching element to be turned off.

Specifically, the first switching element Q1 and the fourth switching element Q4 are kept in states during a predetermined on time period T_on before the fifth switching element Q5 is turned off. The moment of turning on the first switching element Q1 and the fourth switching element Q4 is a point at which a value obtained by adding a slope current I_slope to the current value IL reaches a command value Iref predetermined under a predetermined condition. The slope current I_slope is a digital value generated by the control unit 300 and gradually increases with time.

Figure 5:
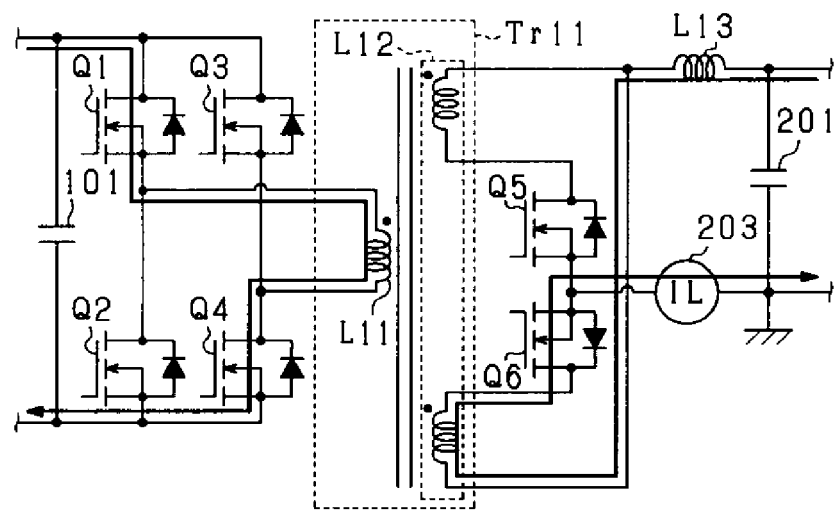
FIG. 5 shows an electrical pathway when first, fourth, fifth and sixth switching elements are in on states.

As a result, as indicated by the electrical pathway in FIG. 5, the magnetic flux generated from the first coil L11 by the current flowing through the first switching element Q1 and the fourth switching element Q4 and the magnetic flux generated from the second coil L12 by the current flowing through the sixth switching element Q6 are balanced, and thus the current flowing through the fifth switching element Q5 decreases.

Figure 6:
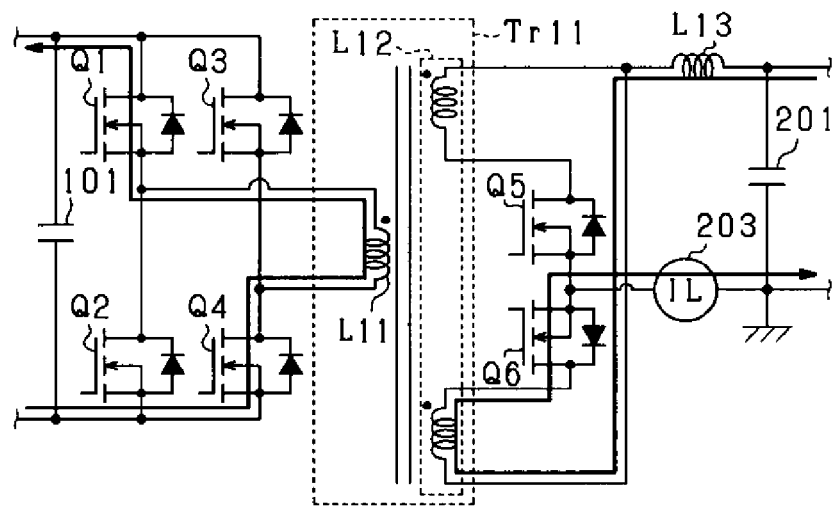
FIG. 6 shows an electrical pathway when a sixth switching element is in an on state.

Next, the first switching element Q1 and the fourth switching element Q4 are turned off, and subsequently, the fifth switching element Q5 is turned off, causing an electrical pathway to be formed through the sixth switching element Q6, as indicated by the electrical pathway shown in FIG. 6, in the area where the second circuit 200 is located, which results in power supply to the area where the first circuit 100 is located.

Figure 7:
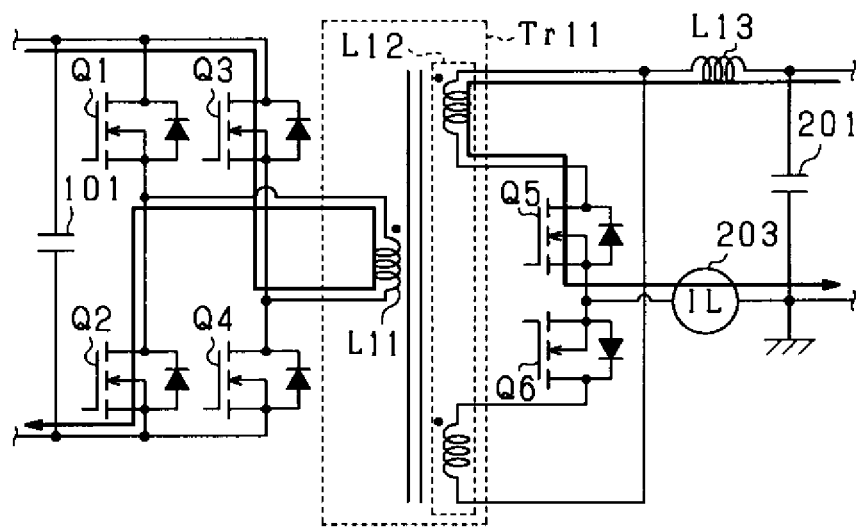
FIG. 7 shows an electrical pathway when second, third, fifth and sixth switching elements are in on states.

The second switching element Q2 and the third switching element Q3 are kept in on states during a predetermined on time period T_on before the sixth switching element Q6 is turned off. As a result, as indicated by the electrical pathway in FIG. 7, the magnetic flux generated from the first coil L11 by the current flowing through the second switching element Q2 and the third switching element Q3 and the magnetic flux generated by the second coil L12 by the current flowing through the fifth switching element Q5 are balanced, and thus the current flowing through the sixth switching element Q6 decreases.

Figure 8:
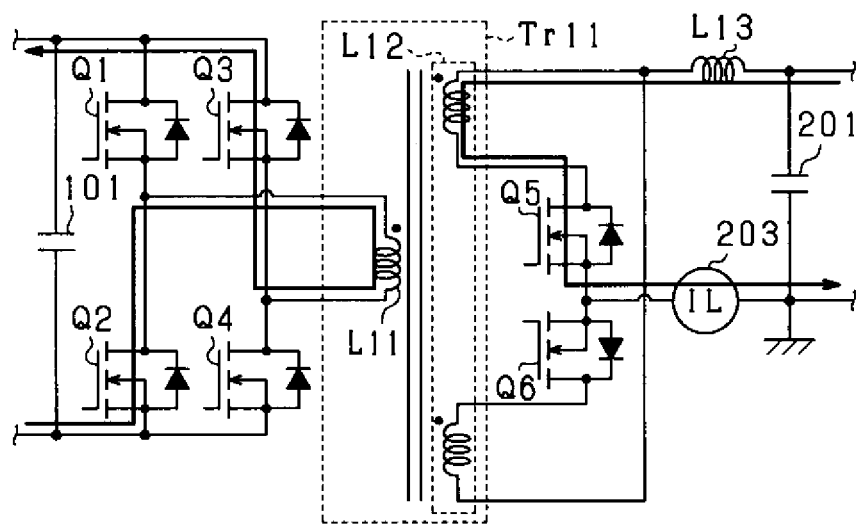
FIG. 8 shows an electrical pathway when a fifth switching element is in an on state.

Next, the second switching element Q2 and the third switching element Q3 are turned off, and subsequently, the sixth switching element Q6 is turned off, causing an electrical pathway to be formed through the fifth switching element Q5, as indicated by the electrical pathway in FIG. 8, in the area where the second circuit 200 is located, which results in power supply to the area where the first circuit 100 is located.

As described above, in the control of turning on the first to fourth switching elements Q1 to Q4, it is preferable that the current flowing through the fifth and sixth switching elements Q5 and Q6 drop to zero during the on time periods T_on of the first to fourth switching elements Q1 to Q4. Thus, the on time period T_on is determined so that the amount of decrease in the current during the on time period T_on becomes equal to the amount of current flowing through the fifth and sixth switching elements Q5 and Q6 at the start of the on time period T_on.

The amount of change in current per unit of time dI/dt in the on time period T_on can be represented by the following expression (1) using the leakage inductance L_leak of the first coil.

[Expression 1]

$$\frac{dI}{dt} = \frac{VH \cdot N}{L\_leak} \quad (1)$$

Assuming that the current flowing through the fifth and sixth switching elements Q5 and Q6 at the start of the on time period T_on is defined as a peak value IL_p, if the following equation (2) is satisfied, the amount of decrease in the current during the on time period T_on becomes equal to the peak value IL_p.

[Expression 2]

$$IL\_p = \frac{VH \cdot N}{L\_leak} \cdot T\_on \quad (2)$$

Solving this equation (2) for the on time period T_on determines the on time period T_on by the following equation (3).

[Expression 3]

$$T\_on = \frac{L\_leak \cdot IL\_P}{VH \cdot N} \quad (3)$$

Figure 3:
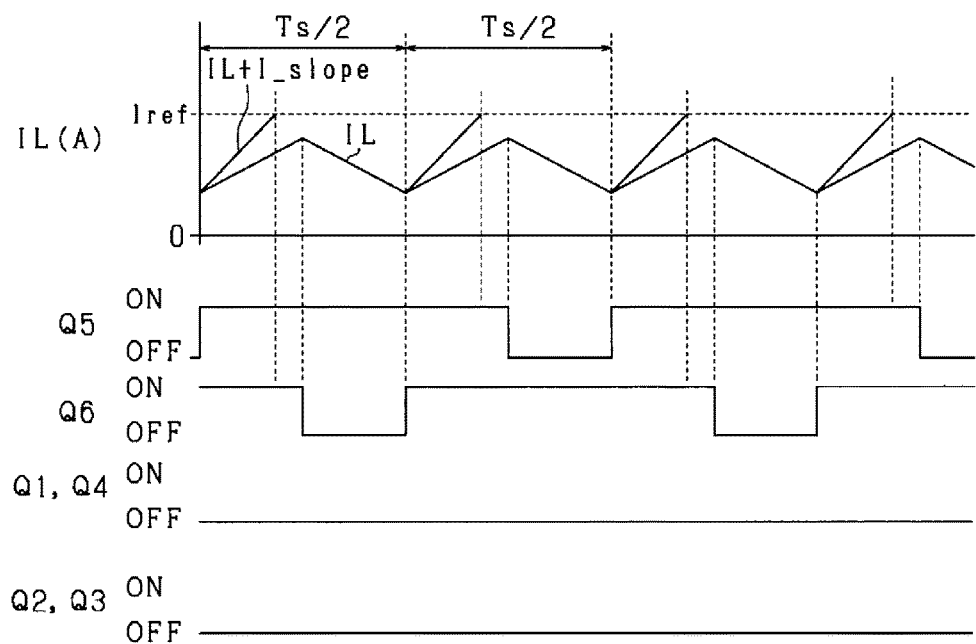
FIG. 3 is a time chart of a second control.

In the second control illustrated in FIG. 3, the first to fourth switching elements Q1 to Q4 are kept in off states in the first circuit 100. As indicated by the above expression (3), the on time period T_on decreases as the peak value IL_p decreases. Since accurate control becomes more difficult as the on time period T_on decreases, a threshold value ILth is set for the peak value IL_p, and the second control is performed when the peak value IL_p is less than the threshold value ILth.

The condition for performing the first control is that the first voltage VH is greater than a first threshold value V1 and less than a second threshold value V2, and the second voltage VB is greater than a third threshold value V3 and less than a fourth threshold value V4. This is because the accuracy of the control decreases, for example, if the first voltage VH is too high or too low or the second voltage VB is too high or too low.

Figure 9:
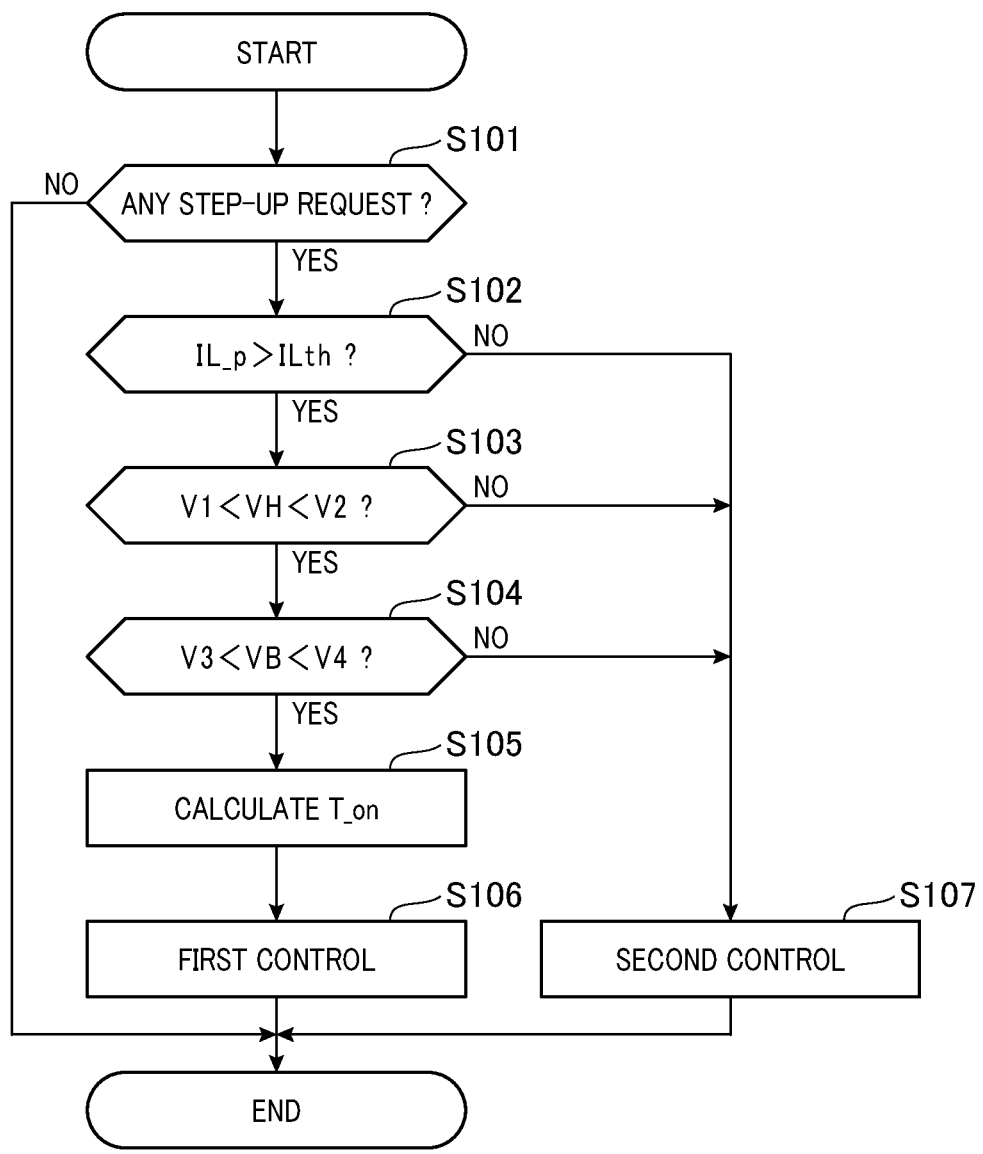
FIG. 9 is a flowchart illustrating a process which a control unit performs.

The above-described process which the control unit 300 performs will be described with reference to the flowchart in FIG. 9. First, whether or not a step-up request has been obtained is determined in step S101. This step-up request is, for example, a command transmitted from a higher-order electronic control unit (ECU). IF the determination result in step S101 is negative, that is, when no step-up request has been received from the ECU, a series of processes is directly brought to an end. Note that the case in which the determination result in step S101 is negative includes a case of receiving a step-down request for supplying power from the first circuit 100 to the second circuit 200 or a request for charging the capacitor 101 of the first circuit 100. Since the control in response to these requests is known, specific description thereof will be omitted.

If the determination result in step S101 is affirmative, that is, when the step-up request has been received, the flow proceeds to step S102 where whether or not the peak value IL_p, which is the value of the current at the start of the on time period T_on, is greater than the threshold value ILth is determined. If the determination result in step S102 is affirmative, the flow proceeds to step S103 where whether or not the value of the first voltage VH is greater than the first threshold value V1 and less than the second threshold value V2 is determined. If the determination result in step S103 is affirmative, the flow proceeds to step S104 where whether or not the value of the second voltage VB is greater than the third threshold value V3 and less than the fourth threshold value V4.

If the determination result in step S104 is affirmative, the flow proceeds to step S105 where the on time period T_on is calculated by the above expression (3). The flow then proceeds to step S106 where the control using the on time period T_on, that is, the first control illustrated in FIG. 2, is performed. Subsequently, the series of processes is brought to an end. On the other hand, if the determination result in any of steps S102 to S104 is negative, it is assumed that the condition for performing the first control is not satisfied, and the flow proceeds to Step S107 where the second control illustrated in FIG. 3 is performed. Subsequently, the series of processes is brought to an end.

Figure 10:
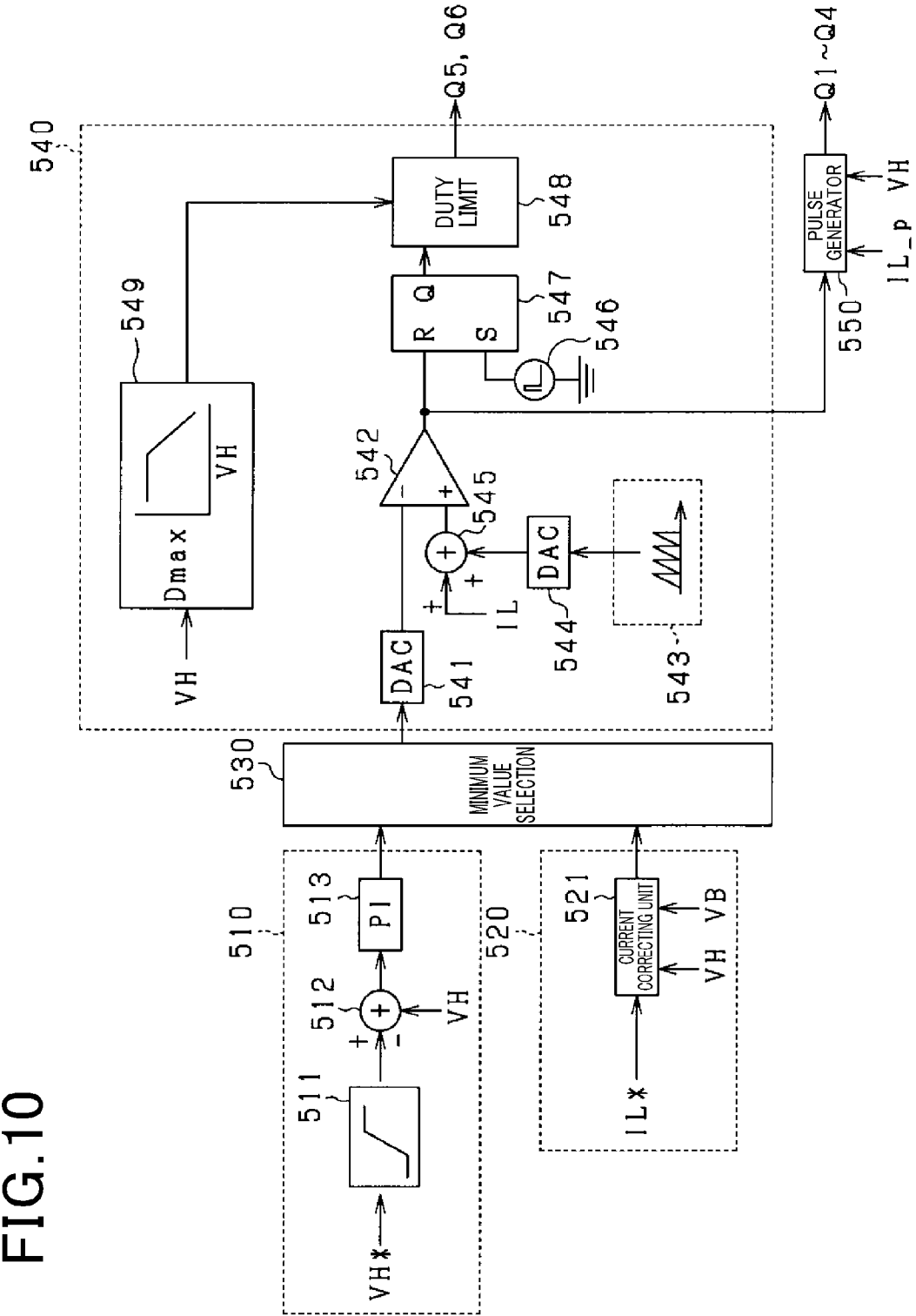
FIG. 10 is a control block diagram illustrating a process which a control unit performs.

Next, the control performed when electrical power is supplied from the second circuit 200 to the first circuit 100 will be described with reference to the control block diagram shown in FIG. 10.

When electrical power is supplied from the first circuit 100 to the second circuit 200, the control is performed using a smaller one of a constant voltage command value Iref_cv, which is a command value for the electric current value IL in the constant voltage control, and a constant current command value Iref_cc, which is a command value for the electric current value IL in the constant current control.

A constant voltage control unit 510 obtains a voltage command value VH*, which is a command value for the first voltage VH, and inputs the voltage command value VH* to a gradual changer 511. The voltage command value VH* may be stored in a memory included in the control unit 300 or may be obtained from the higher-order ECU or the like. The gradual changer 511 outputs a larger value as the voltage command value VH* increases. The output value of the gradual changer 511 is input to an adder 512. The first voltage VH detected by the first voltage detection unit 102 is also input to the adder 512, and the difference between the voltage command value VH* and the first voltage VH is calculated. The difference between the voltage command value VH* and the first voltage VH is input to a PI controller 513, and the constant voltage command value Iref_cv, which is the output value of the PI controller 513, is input to a minimum value selecting unit 530.

A constant current control unit 520 obtains a current command value IL*, the first voltage VH, and the second voltage VB, and inputs them to a current correcting unit 521. The current command value IL* may be stored in the memory included in the control unit 300 or may be obtained from the higher-order ECU or the like. The current correcting unit 521 calculates a correction value for the current command value IL* and adds the correction value to the current command value IL*. Subsequently, the value obtained by adding the correction value to the current command value IL* is input to the minimum value selecting unit 530.

The process performed by the current correcting unit 521 will be specifically described. In order to maintain the average value of the current value IL constant, the increase in the current value IL in the period during which the fifth switching element Q5 and the sixth switching element Q6 are both kept in an on state and the decrease in the current value IL in the case in which one of the fifth switching element Q5 and the sixth switching element Q6 is in an on state and the other is in an off state need to be equal. Thus, using a duty cycle D, which is a ratio of the time period during which the fifth switching element Q5 and the sixth switching element Q6 are both kept in an on state to one control period Ts established the following expression (4).

[Expression 4]

$$D \cdot \frac{VB}{L} + (1 - D) \cdot \left(VB - \frac{VH}{N}\right) \cdot \frac{1}{L} = 0 \quad (4)$$

Solving the above expression (4) for the duty cycle D allows the duty cycle D to be determined by the following expression (5).

[Expression 5]

$$D = 1 - \frac{N \cdot VB}{VH} \quad (5)$$

In the present embodiment, timing for turning off the fifth switching element Q5 and the sixth switching element Q6 is controlled so that the value obtained by adding the slope current I_slope to the current value IL becomes the constant current command value Iref_cc. Hence, using the amount of ripple ΔIL relative to the average value of the current value IL and the amount of variation ΔIs of the slope current I_slope to be added, the constant current command value Iref_cc is calculated by the following equation (6), where m denotes the amount of increase in the slope current I_slope per unit of time.

[Expression 6]

$$\begin{aligned}
Iref\_cc &= IL* + \frac{\Delta IL}{2} + \Delta Is \\
&= IL* + \frac{1}{2\eta} \cdot D \cdot Ts \cdot \left(\frac{VB}{2L} + m\right) \\
&= IL* + \frac{Ts}{2\eta} \cdot \left(1 - \frac{N \cdot VB}{VH}\right) \cdot \left(\frac{VB}{2L} + m\right) \\
&= IL* + \frac{Ts}{4 \cdot L \cdot \eta} \cdot VB - \frac{Ts \cdot N}{4 \cdot L \cdot \eta} \cdot \frac{VB^2}{VH} + \frac{m}{\eta} \cdot \frac{Ts}{2} \cdot \left(1 - \frac{N \cdot VB}{VH}\right)
\end{aligned} \quad (6)$$

The current correcting unit 521 carries out computation using the expression (6) determined as described above and inputs the calculated constant current command value Iref_cc to the minimum value selecting unit 530.

The minimum value selecting unit 530 outputs, to a peak current control unit 540, the smaller one of the constant voltage command value Iref_cv obtained from the constant voltage control unit 510 and the command value Iref_cc obtained from the constant current control unit 520. In the peak current control unit 540, the command value is converted into an analog value in a DA converter 541 and input to the negative terminal of a comparator 542.

Meanwhile, a slope compensating unit 543 of the peak current control unit 540 generates, as a signal, a value of the slope current I_slope obtained from a value of a register, and inputs the signal to a DA converter 544. This slope current I_slope is a sawtooth signal which monotonically increases in a linear fashion from 0 A in each control period, as described above. The slope current I_slope converted by the DA converter 544 into an analog waveform and the current value IL detected by the current detection unit 203 are added at an adder 545 and then input to the positive terminal of the comparator 542. Note that the slope compensating unit 543 may generate a signal of the analog waveform and input the signal to the comparator 542 directly, i.e., not via the DA converter 544.

The comparator 542 compares the command value input to the negative terminal and the value obtained by adding the slope current I_slope to the current value IL and then input to the positive terminal. A high-level signal is input to the R terminal of an RS flip-flop 547 in a time period during which the input value of the positive terminal is less than the input value of the negative terminal, and a low-level signal is input to the R terminal of the RS flip-flop 547 in a time period during which the input value of the positive terminal is more than the input value of the negative terminal. Furthermore, a clock signal is input from a clock 546 to the S terminal of the RS flip-flop 547.

A duty limit unit 548 sets an upper limit value and a lower limit value for a duty value of the output of the RS flip-flop 547. The duty limit unit 548 receives an upper limit value of the duty cycle D from an upper limit setting unit 549. The upper limit value is set to a value that is constant until the first voltage VH reaches a predetermined value, and when the first voltage VH is more than the predetermined value, decreases as the first voltage VH increases. Meanwhile, the lower limit of the duty cycle D is set to a value more than 50% so that the on time period of the fifth switching element Q5 and the on time period of the sixth switching element Q6 overlap with each other. The output of the RS flip-flop 547 is output to the fifth switching element Q5 and the sixth switching element Q6 via the duty limit unit 548.

Meanwhile, an output signal indicating a high level from the comparator 542 is input to a pulse generator 550. The peak value IL_p and the first voltage VH are input to the pulse generator 550, and the on time period T_on is calculated by the above expression (3). Subsequently, the pulse generator 550 transmits a drive signal that is in an on state only during the on time period T_on to a set of the first switching element Q1 and the fourth switching element Q4 or a set of the second switching element Q2 and the third switching element Q3.

Figure 11:
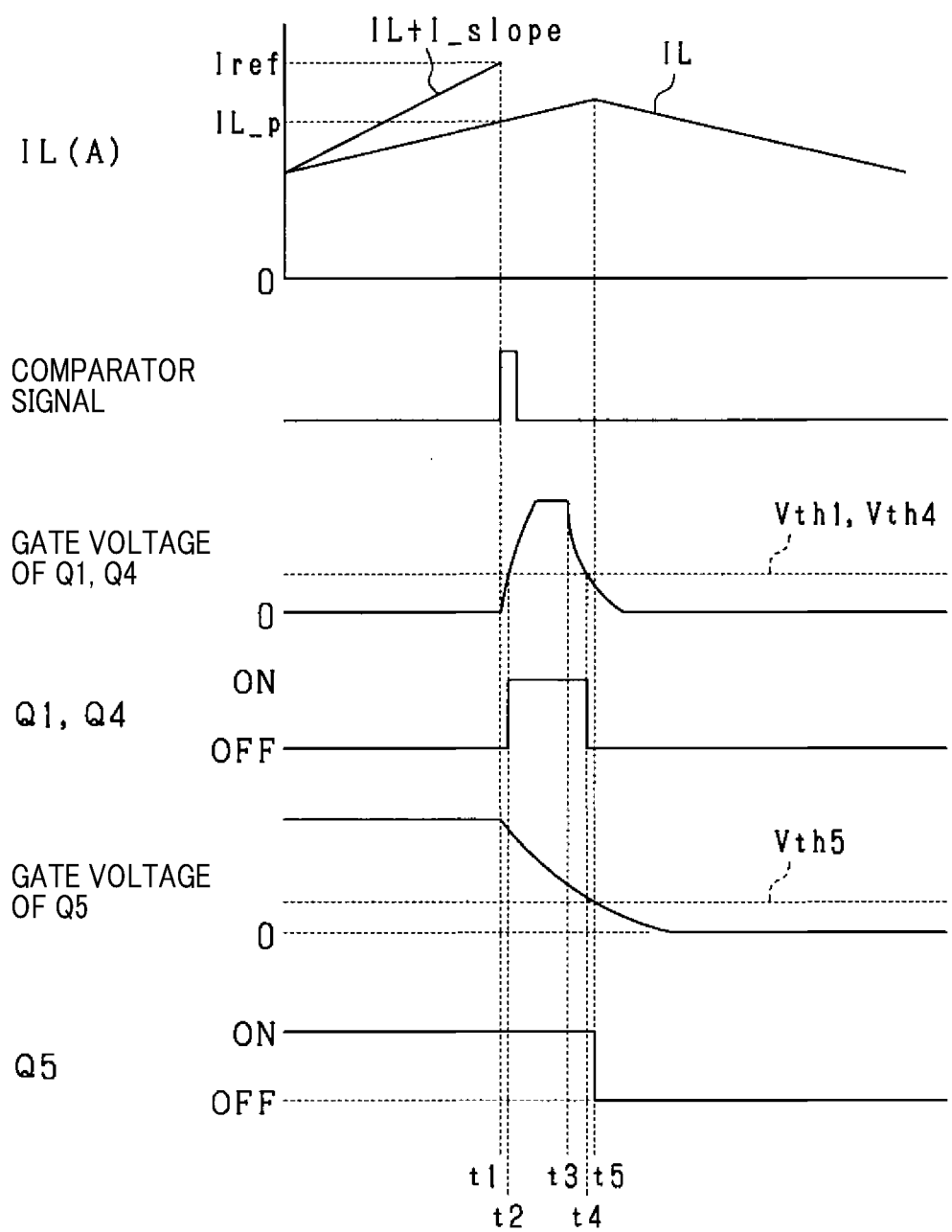
FIG. 11 is a time chart showing details of control.

A comparator signal output from the comparator 542 described above and the gate voltage and an on/off state of each switching element will be described with reference to FIG. 11. Note that since the control for keeping the second and third switching elements Q2 and Q3 in on states for a predetermined time period before turning off the sixth switching element Q6 is similar to that described above, specific description thereof will be omitted.

First, at time t1, the comparator 542 generates a comparator signal when the value obtained by adding the slope current Is to the current value IL increases up to the current command value Iref. The comparator signal is transmitted to the fifth switching element Q5, the first switching element Q1, and the fourth switching element Q4. In response to the comparator signal, the gate voltage of the fifth switching element Q5 starts decreasing, and the gate voltage of the first switching element Q1 and the gate voltage of the fourth switching element Q4 start increasing.

At time t2, the first switching element Q1 and the fourth switching element Q4 are turned on when the gate voltage of the first switching element Q1 and the gate voltage of the fourth switching element Q4 reach a gate threshold value Vth1 and a gate threshold value Vth4, respectively. This results in the decrease in the current flowing through the fifth switching element Q5. Subsequently, at time t3, the gate voltage of the first switching element Q1 and the gate voltage of the fourth switching element Q4 start decreasing when a signal for turning off the first switching element Q1 and the fifth switching element Q5 are transmitted. At time t4, the first switching element Q1 and the fourth switching element Q4 are turned off when the gate voltage of the first switching element Q1 and the gate voltage of the fourth switching element Q4 reach the gate threshold value Vth1 and the gate threshold value Vth4, respectively.

In this case, the timing at time t3 may be set so that the on time period T_on of the first switching element Q1 and the fourth switching element Q4 is the time period during which the first switching element Q1 and the fourth switching element Q4 are actually kept in on states. Alternatively, the on time period T_on may be the time period from time t1 when the gate voltage of the first switching element Q1 and the gate voltage of the fourth switching element Q4 start increasing to time t3 when the gate voltage of the first switching element Q1 and the gate voltage of the fourth switching element Q4 start decreasing. Alternatively, the on time period T_on may be set based on another time period.

After the gate voltage of the first switching element Q1 and the gate voltage of the fourth switching element Q4 fall below the gate threshold value Vth1 and the gate threshold value Vth4, respectively, the fifth switching element Q5 is turned off when the gate voltage of the fifth switching element Q5 falls below the threshold value th5 at time t5. When the fifth switching element Q5 is turned off, electrical power is supplied from the second circuit 200 to the first circuit 100, and the current value IL decreases.

Figure 12A:
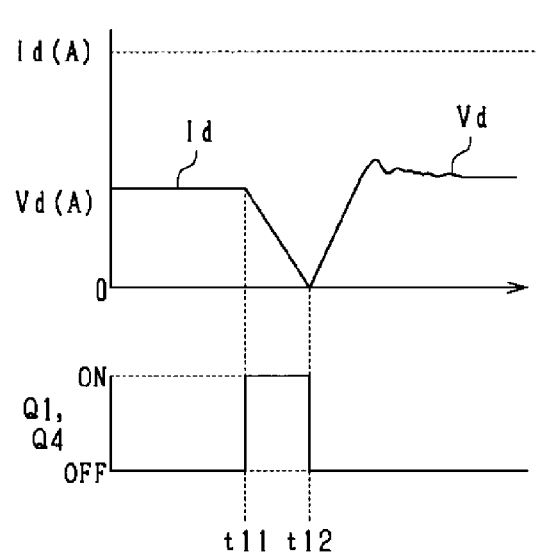
FIGS. 12A and 12B illustrate effects of the process according to an embodiment.

A current Id flowing through the fifth switching element Q5 and a voltage Vd generated in the fifth switching element Q5 when the above control is performed will be described with reference to FIGS. 12A and 12B. As illustrated in FIG. 12A, when the first and fourth switching elements Q1 and Q4 are turned on at time t11, the current Id starts decreasing and then, at time t12, the current becomes zero. This shows that even if the fifth switching element Q5 is turned on at the time t12, the amount of difference between the voltage Vd and the floor level is relatively small, and thus the surge voltage is suppressed.

Figure 12B:
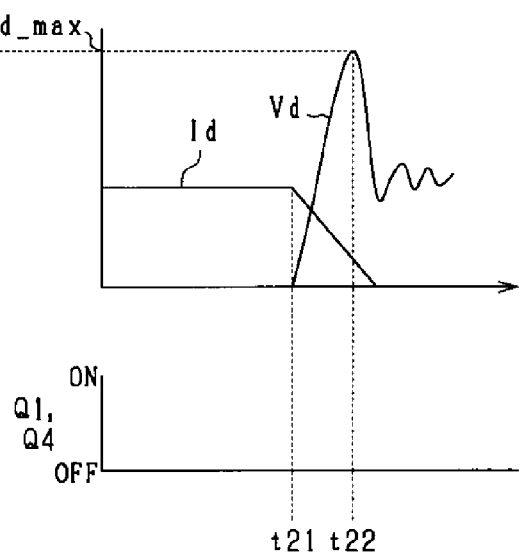

Meanwhile, as illustrated in FIG. 12B, when the first and fourth switching elements Q1 and Q4 are not turned on, the voltage Vd rises at time t21 when the fifth switching element Q5 is turned on, and the current Id decreases accordingly. Subsequently, the voltage Vd reaches the maxim value Vd_max at time t22. That is, it can be seen that a surge voltage greater than that in the case illustrated in FIG. 12A is generated because the control of turning on the first and fourth switching elements Q1 and Q4 is not performed. Afterward, the voltage Vd decays and, as in the case illustrated in FIG. 12A, the voltage Vd converges on the floor level.

With the aforementioned configuration, the power converter 10 according to the present embodiment provides the following effects.

When the current value IL of the choke coil L13 is more than a predetermined value, that is, when the current value IL of the choke coil 13 becomes large enough and there is a high risk of the occurrence of an excessive surge voltage in the fifth and sixth switching elements Q5 and Q6, the control of keeping the first to fourth switching elements Q1 to Q4 in on states during a predetermined time period is performed, and thus the surge voltage that is generated in the fifth and sixth switching elements Q5 and Q6 can be appropriately suppressed. On the other hand, when the current value IL of the choke coil L13 is less than the predetermined value, that is, when there is a probability that the control of keeping the first to fourth switching elements Q1 to Q4 in on states during the predetermined time period may cause an excessive reverse current, the control of keeping the first to fourth switching elements Q1 to Q4 in on states during the predetermined time period is not performed, and thus the occurrence of a reverse current before the fifth and sixth switching elements Q5 and Q6 are turned off can be prevented. Thus, the surge voltage that is generated in the fifth and sixth switching element Q5 and Q6 can be suppressed.

When the time period during which the first to fourth switching elements Q1 to Q4 are kept in on states is too earlier than the timing for turning off the fifth and sixth switching elements Q5 and Q6, the first-side switching elements resumes storing current after the fifth and sixth switching elements Q5 and Q6 are turned off. On the other hand, when the timing for turning off the first to fourth switching elements Q1 to Q4 is later than the timing for turning off the fifth and sixth switching elements Q5 and Q6, it becomes unable to sufficiently reduce the current of the fifth and sixth switching elements Q5 and Q6. In the present embodiment, the condition for generating a signal to be transmitted to the fifth and sixth switching elements Q5 and Q6 and the condition for generating a signal to be transmitted to the first to fourth switching elements Q1 to Q4 are the same, and the operation of turning off the fifth and sixth switching elements Q5 and Q6 is later than the operation of turning off the first to fourth switching elements Q1 to Q4, allowing accurate control of the timing for turning off the fifth and sixth switching elements Q5 and Q6 and the timing for ending the on time period of the first to fourth switching elements Q1 to Q4.

For the comparison between the current value IL and the command value Iref, when a comparator used for generating a signal to be transmitted to the fifth and sixth switching elements Q5 and Q6 and a comparator used for generating a signal to be transmitted to the first to fourth switching elements Q1 to Q4 are separately provided, there are cases in which a difference occurs in the result of the comparison, causing decrease in accuracy of the control. In this regard, since the first signal for turning on the first to fourth switching elements Q1 to Q4 and the second signal for turning off the fifth and sixth switching elements Q5 and Q6 are generated according to the same result of the comparison by a single comparator 542, the accuracy of the control can be improved.

Although the time period during which the first to fourth switching elements Q1 to Q4 are kept in on states needs to be shorter as the current value IL of the second circuit 200 is smaller, the difficulty in accurate switching from an on state to an off state increases as the time period during which the first to fourth switching elements Q1 to Q4 are kept in on states shortens. Furthermore, as the current value IL is smaller, the surge voltage also decreases, and thus the effect of the control of keeping the first to fourth switching elements Q1 to Q4 in on states during the predetermined time period is reduced. In this regard, when the current value IL of the second circuit 200 is less than the predetermined threshold value ILth, the control of keeping the first to fourth switching elements Q1 to Q2 in on states during the predetermined time period is prohibited, and thus control that may cause decrease in the accuracy can be inhibited from being performed in the situation in which the effect provided by keeping the first to fourth switching elements Q1 to Q4 in on states during the predetermined time period is small.

Second Embodiment

Figure 13:
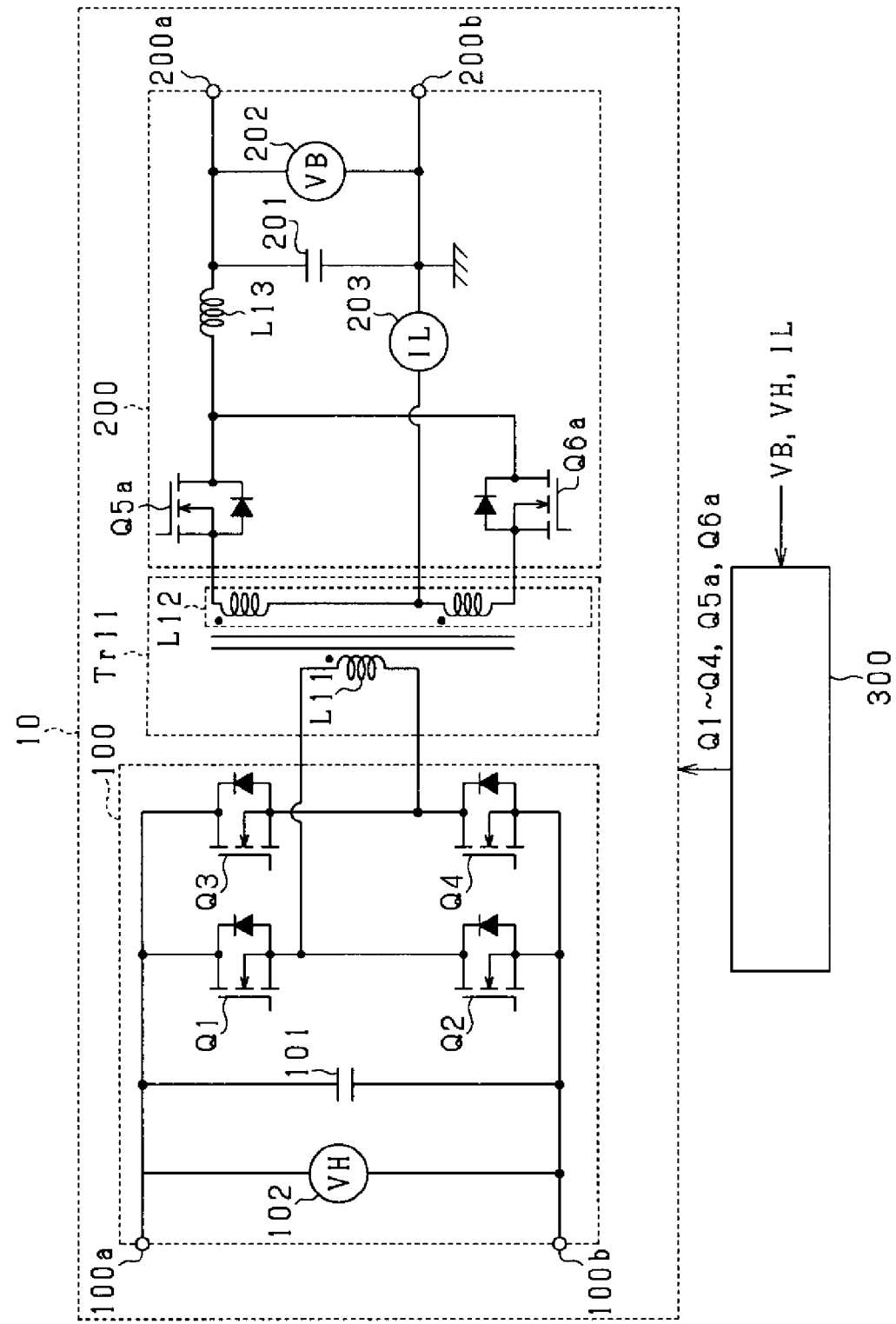
FIG. 13 is a circuit diagram of a power converter according to a second embodiment.

The power converter 10 according to the present embodiment is different in a part of the second circuit 200 from that of the first embodiment. FIG. 13 is a circuit diagram of the power converter 10 according to the present embodiment. In the power converter 10, the source of a fifth switching element Q5a and the source of a sixth switching element Q6a are connected to the ends of the second coil L12 included in the transformer Tr11. Meanwhile, the drain of the fifth switching element Q5a and the drain of the sixth switching element Q6a are connected to each other, and the connection point therebetween is connected to one end of the choke coil L 13. The center tap of the second coil L12 is connected to the negative electrode side terminal 200b. The configuration of the first circuit 100 is similar to that of the first embodiment, and thus description thereof will be omitted. In this case, the process performed by the control unit 300 will be similar to that of the first embodiment.

Third Embodiment

Figure 14:
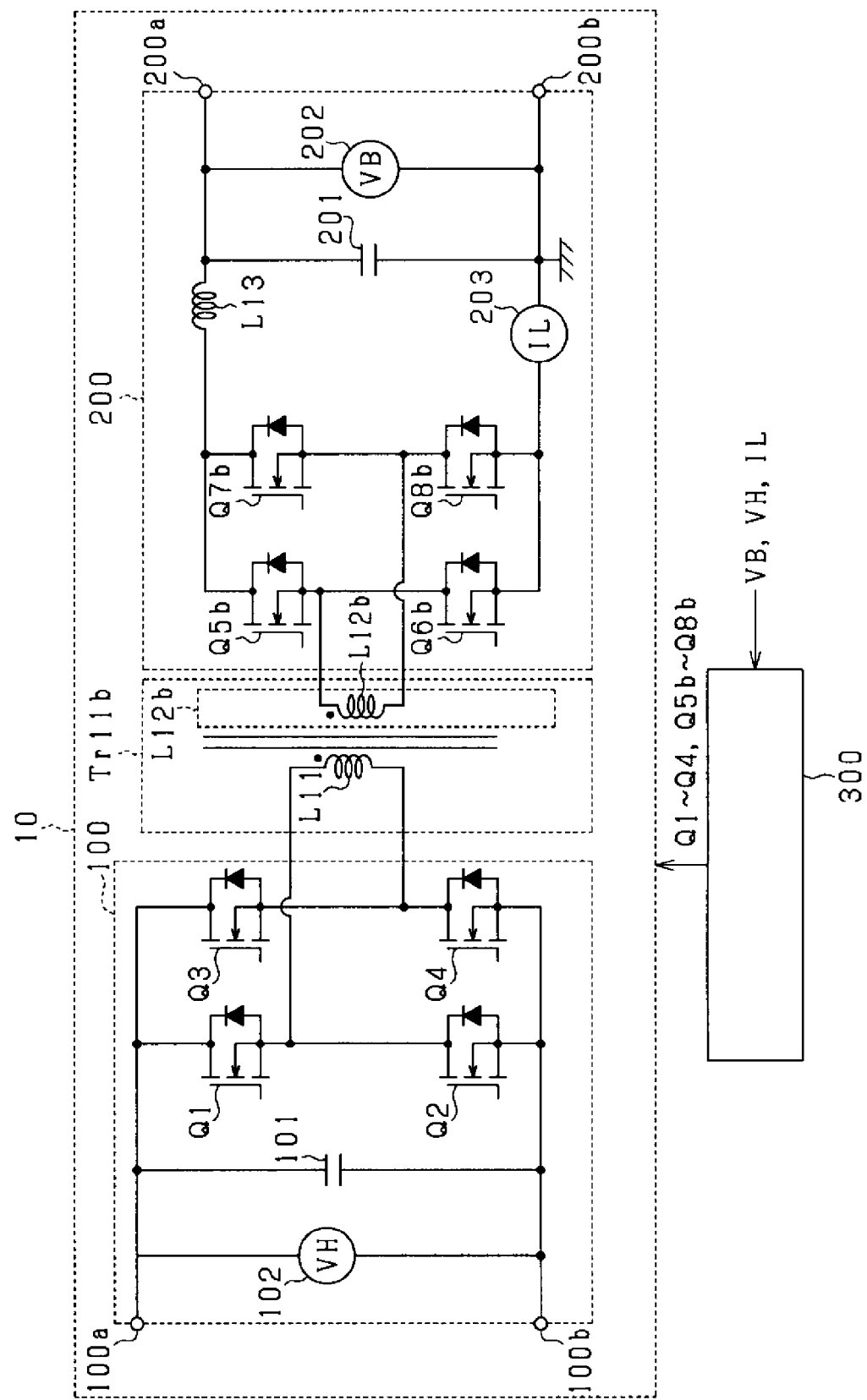
FIG. 14 is a circuit diagram of a power converter according to a third embodiment.

The power converter 10 according to the present embodiment is different in a part of the second circuit 200 from that of the first embodiment. FIG. 14 is a circuit diagram of the power converter 10 according to the present embodiment. The power converter 10 includes the first circuit 100, the second circuit 200, and a transformer Tr11b including the first coil L11 and a second coil L12b. The turn ratio between the first coil L11 and the second coil L12b is N:1.

In the second circuit 200, the source of a fifth switching element Q5b and the drain of a sixth switching element Q6b are connected to each other, and the connection point therebetween is connected to one end of the second coil L12b. Meanwhile, the source of a seventh switching element Q7b and the drain of an eighth switching element Q8b are connected to each other, and the connection point therebetween is connected to the other end of the second coil L12b. The drain of the fifth switching element Q5b and the drain of the seventh switching element Q7b are connected to one end of the choke coil L13, and the other end of the choke coil L13 is connected to the positive electrode side terminal 200a. The source of the sixth switching element Q6b and the source of the eighth switching element Q8b are connected to the negative electrode side terminal 200b.

The configuration of the first circuit 100 is similar to that of the first embodiment, and thus description thereof will be omitted.

Figure 15:
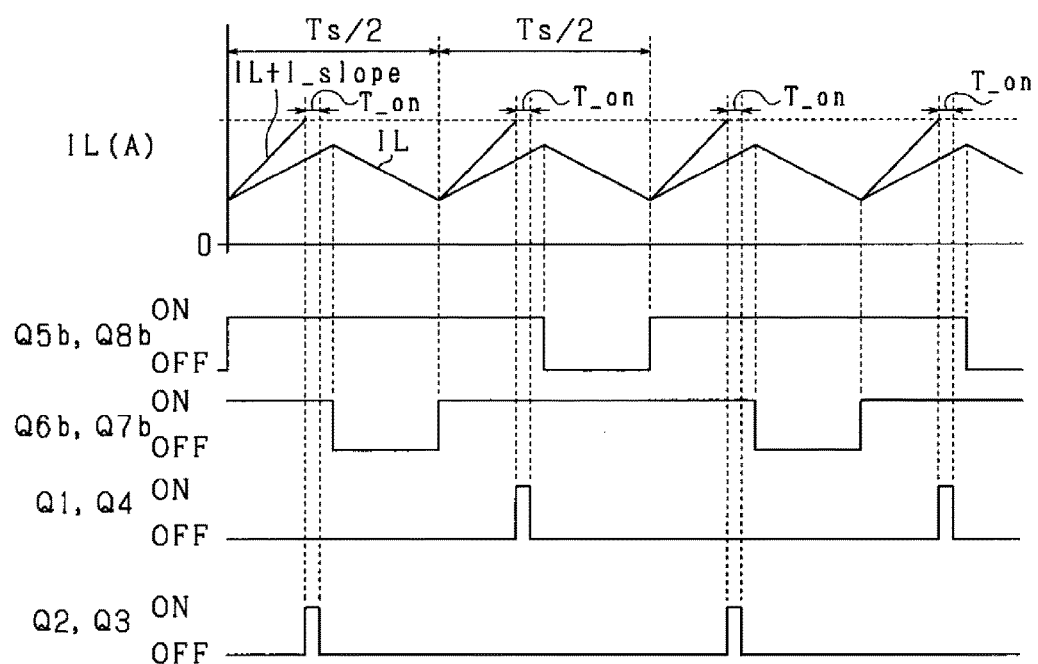
FIG. 15 is a time chart illustrating a process according to the third embodiment.

The process performed by the control unit 300 according to the present embodiment will be described with reference to FIG. 15. As illustrated in FIG. 15, in the area where the second circuit is located, the fifth switching element Q5b and the eighth switching element Q8b are controlled in synchronization, and the sixth switching element Q6b and the seventh switching element Q7b are controlled in synchronization. In this case, before the fifth switching element Q5b and the eighth switching element Q8b are turned off in synchronization, the first switching element Q1 and the fourth switching element Q4 are kept in on states in synchronization during a predetermined time period in the first circuit 100. Likewise, before the sixth switching element Q6b and the seventh switching element Q7b are turned off in synchronization, the second switching element Q2 and the third switching element Q3 are kept in on states in synchronization during a predetermined time period in the first circuit 100.

Accordingly, effects similar to those obtained in the first embodiment can be provided.

Modifications

In the embodiments, the result of the determination by the comparator 542 is bifurcated and used for each of the control signal for the area where the first circuit 100 is located and the control signal for the area where the second circuit 200 is located, but separate comparators may be used to generate the control signal for the area where the first circuit 100 is located and the control signal for the area where the second circuit 200 is located.

In the embodiments, the time constant of the gate voltage of the fifth and sixth switching elements Q5 and Q6 and the time constant of the gate voltage of the first to fourth switching elements Q1 to Q4 are made different to delay the timing for turning OFF the fifth and sixth switching elements Q5 and Q6. In this regard, for transmitting a signal based on the result of the determination by the comparator 542 to the fifth and sixth switching elements Q5 and Q6, a delay unit that delays transmission of the signal may be provided to delay the timing for turning off the fifth and sixth switching elements Q5 and Q6.

In the embodiments, the value of the on time period T_on of the first to fourth switching elements Q1 to Q4 is variable, but the amount of delay in the timing for turning OFF the fifth and sixth switching elements Q5 and Q6 may be set to be variable. If the timing for turning OFF the fifth and sixth switching elements Q5 and Q6 is constant, as the on time period T_on of the first to fourth switching elements Q1 to Q4 is shorter, the interval between turning OFF the first to fourth switching elements Q1 to Q4 and turning off the fifth and sixth switching elements Q5 and Q6 increases. Furthermore, as the on time period T_on of the first to fourth switching elements Q1 to Q4 is longer, it is more likely that the fifth and sixth switching elements Q5 and Q6 are turned off before turning off the first to fourth switching elements Q1 to Q4. Thus, the amount of delay in the timing for turning off the fifth and sixth switching elements Q5 and Q6 may be shortened as the on time period T_on of the first to fourth switching elements Q1 to Q4 is shorter, and the amount of delay in the timing for turning off the fifth and sixth switching elements Q5 and Q6 may be lengthened as the on time period T_on of the first to fourth switching elements Q1 to Q4 is longer. Note that, as described above, the on time period T_on increases with increase in the peak value IL_p of the current and decreases with increase in the first voltage VH. Thus, the amount of delay may also be increased with increase in the peak value IL_p of the current and be decreased with increase in the first voltage VH.

When the control of keeping the first to fourth switching elements Q1 to Q4 in on states during the predetermined time period before turning off the fifth and sixth switching elements Q5 and Q6 is not performed, a surge voltage is generated as illustrated in FIG. 12. This surge voltage Vd increases as the current flowing through the second circuit 200 increases. That is, the maximum value Vd_max indicated in FIG. 12 increases. Meanwhile, as described in the embodiments, the on time period T_on of the first to fourth switching elements Q1 to Q4 is lengthened as the current flowing through the second circuit 200 is larger. Thus, a voltage detection unit that detects the maximum value Vd_max of the surge voltage Vd may further be provided, and as the voltage detected by the voltage detection unit is larger, the on time period T_on of the first to fourth switching elements Q1 to Q4 may be lengthened or the amount of delay in the timing for turning off the fifth and sixth switching elements Q5 and Q6 may be increased.

Although the embodiments use N-type MOSFETs as the switching elements Q1 to Q7, P-type MOSFETs or other elements may be used instead.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a control apparatus is provided which controls a power converter (10) including a first circuit (100) including a plurality of first-side switching elements (Q1 to Q4), and a second circuit (200) that is connected to the first circuit via a transformer (Tr11) and includes a plurality of second-side switching elements (Q5, Q6) and a choke coil (L13). The control apparatus includes: a current obtainment unit which obtains, as an instantaneous value, a value of current flowing through the choke coil; and a control unit which, when electrical power is supplied from the second circuit to the first circuit, keeps a first-side switching element in an on state during a predetermined time period, before turning off at least one second-side switching element among the plurality of second-side switching elements that are in an on state, the first-side switching element being included in the plurality of first-side switching elements and generating a reverse current in the at least one second-side switching element to be turned off. The control unit performs control of keeping the first-side switching element in an on state during the predetermined time period and control of turning off the at least one second-side switching element, on condition that the value of the current obtained by the current obtainment unit is more than a predetermined command value.

With the aforementioned configuration, when the value of the current flowing through the choke coil is equal to or more than the command value, that is, when the current value of the choke coil becomes large enough and there is a high risk of the occurrence of an excessive surge voltage in the second-side switching element, the control of keeping the first-side switching element in an on state during the predetermined time period is performed, and thus the surge voltage that is generated in the second-side switching element can be appropriately suppressed. On the other hand, when the value of the current flowing through the choke coil is less than the command value, that is, when there is a probability that the control of keeping the first-side switching element in an on state during the predetermined time period may cause an excessive reverse current in the second circuit, the control of keeping the first-side switching element in an on state during the predetermined period is not performed, and thus the occurrence of a reverse current before the first-side switching element is turned off can be prevented. Thus, the surge voltage that is generated in the second-side switching element can be suppressed.

What is claimed is:

1. A control apparatus which controls a power converter including a first circuit including a plurality of first-side switching elements, and a second circuit that is connected to the first circuit via a transformer and includes a plurality of second-side switching elements and a choke coil, the control apparatus comprising:
    a current obtainment unit which obtains, as an instantaneous value, a value of current flowing through the choke coil; and
    a control unit which, when electrical power is supplied from the second circuit to the first circuit, keeps a first-side switching element in an on state during a predetermined time period, before turning off at least one second-side switching element among the plurality of second-side switching elements that are in an on state, the first-side switching element being included in the plurality of first-side switching elements and generating a reverse current in the at least one second-side switching element to be turned off, wherein
    the control unit performs control of keeping the first-side switching element in an on state during the predetermined time period and control of turning off the at least one second-side switching element, on condition that the value of the current obtained by the current obtainment unit is more than a predetermined command value.

2. The control apparatus according to claim 1, wherein the control unit transmits a first signal and a second signal on a condition that the value of the electric current obtained by the electric current obtainment unit is greater than the command value, the first signal being for turning on the first-side switching element and the second signal being for turning off the at least one second-side switching element, and
    the control apparatus comprises a delay unit which causes more delay to an operation of turning off the at least one second-side switching element than to an operation of turning off the first-side switching element.

3. The control apparatus according to claim 2, wherein the control unit includes a comparator which compares the value of the current and the command value, and
    the first signal and the second signal are generated according to the same result of comparison by the comparator.

4. The control apparatus according to claim 2, wherein
if the value of the current upon turning on the first-side switching element is less than a predetermined threshold value, the control unit prohibits the control of keeping the first-side switching element in an on state during the predetermined time period.

5. The control apparatus according to claim 2, wherein
the control unit sets the predetermined time period during which the first-side switching element is kept in an on state to be longer as the value of the current upon turning on the first-side switching element increases.

6. The control apparatus according to claim 2, wherein
the control unit sets the predetermined time period during which the first-side switching element is kept in an on state to be shorter as voltage in an area where the first circuit is located is higher.

7. The control apparatus according to claim 5, wherein
the control unit determines T_on, which is a time period during which the first-side switching element is kept in an on state by $$T\_on = \frac{L\_leak \cdot IL\_P}{VH \cdot N}$$

where L_leak is leakage inductance of the transformer on a side of the first circuit, IL_p is the value of the current upon turning on the first-side switching element, VH is voltage in an area where the first circuit is located, and a turn ratio of the transformer between the side of the first circuit and a side of the second circuit is N:1.

8. The control apparatus according to claim 2, wherein
the delay unit changes delay time based on at least one of the value of the current and voltage in an area where the first circuit is located.

9. The control apparatus according claim 1, further comprising a voltage obtainment unit which obtains a maximum value of voltage to be applied to the choke coil, wherein
the control unit sets the predetermined time period during which the first-side switching element is kept in an on state to be longer as the voltage obtained by the voltage obtainment unit is larger.

* * * * *